(12) United States Patent
Huh et al.

(10) Patent No.: US 10,225,687 B2
(45) Date of Patent: *Mar. 5, 2019

(54) CONTENT PROVIDING SYSTEM BASED ON LOCATION INFORMATION RECOGNITION

(71) Applicant: SK Planet Co., Ltd., Seongnam-si (KR)

(72) Inventors: Jae Hyung Huh, Seongnam-si (KR); Chul Yong Shin, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,507

(22) Filed: Apr. 5, 2018

(65) Prior Publication Data

US 2018/0234790 A1    Aug. 16, 2018

Related U.S. Application Data

(62) Division of application No. 14/521,214, filed on Oct. 22, 2014, now Pat. No. 9,967,700.

(30) Foreign Application Priority Data

Aug. 11, 2014  (KR) .......................... 10-2014-0103601

(51) Int. Cl.
*H04W 4/02* (2018.01)

(52) U.S. Cl.
CPC ..................................... *H04W 4/02* (2013.01)

(58) Field of Classification Search
CPC . H04W 36/08; H04W 92/02; H04W 36/0022; H04W 36/36; H04W 84/042; H04W 36/0016; H04W 4/02; H04W 48/08; H04W 48/10; H04W 64/00; H04W 72/02; H04W 84/045; H04W 92/22; H04W 36/00; H04W 36/24; H04W 36/30; H04W 4/008; H04L 12/5692; H04M 1/72572; G06F 17/30241

See application file for complete search history.

(56) References Cited

U.S. PATENT DOCUMENTS

| | | |
|---|---|---|
| 6,253,088 B1 | 6/2001 | Wenk et al. |
| 9,349,104 B2 | 5/2016 | O'Neill et al. |
| 2008/0108367 A1 | 5/2008 | Afrashteh et al. |
| 2008/0279168 A1 | 11/2008 | Kalhan et al. |
| 2009/0104911 A1 | 4/2009 | Watanabe et al. |
| 2011/0085518 A1 | 4/2011 | Taaghol et al. |
| 2011/0256894 A1 | 10/2011 | Khandelia et al. |
| 2013/0089075 A1 | 4/2013 | Lim |
| 2013/0116966 A1 | 5/2013 | D'Jesus Bencci et al. |
| 2013/0268353 A1 | 10/2013 | Zeto, III et al. |
| 2015/0264647 A1 | 9/2015 | Lacatus et al. |
| 2016/0309294 A1 | 10/2016 | Li et al. |

*Primary Examiner* — Nizar N Sivji

(74) *Attorney, Agent, or Firm* — Brinks Gilson & Lione

(57) ABSTRACT

The present disclosure relates to a user terminal capable of recognizing each of location signals output from a plurality of location signal output devices that have different coverages and output location signals, and a technology capable of detecting a location of a user terminal according to a location signal which the user terminal recognizes and providing various contents to a user through a service server providing content information suitable for the corresponding location.

16 Claims, 5 Drawing Sheets

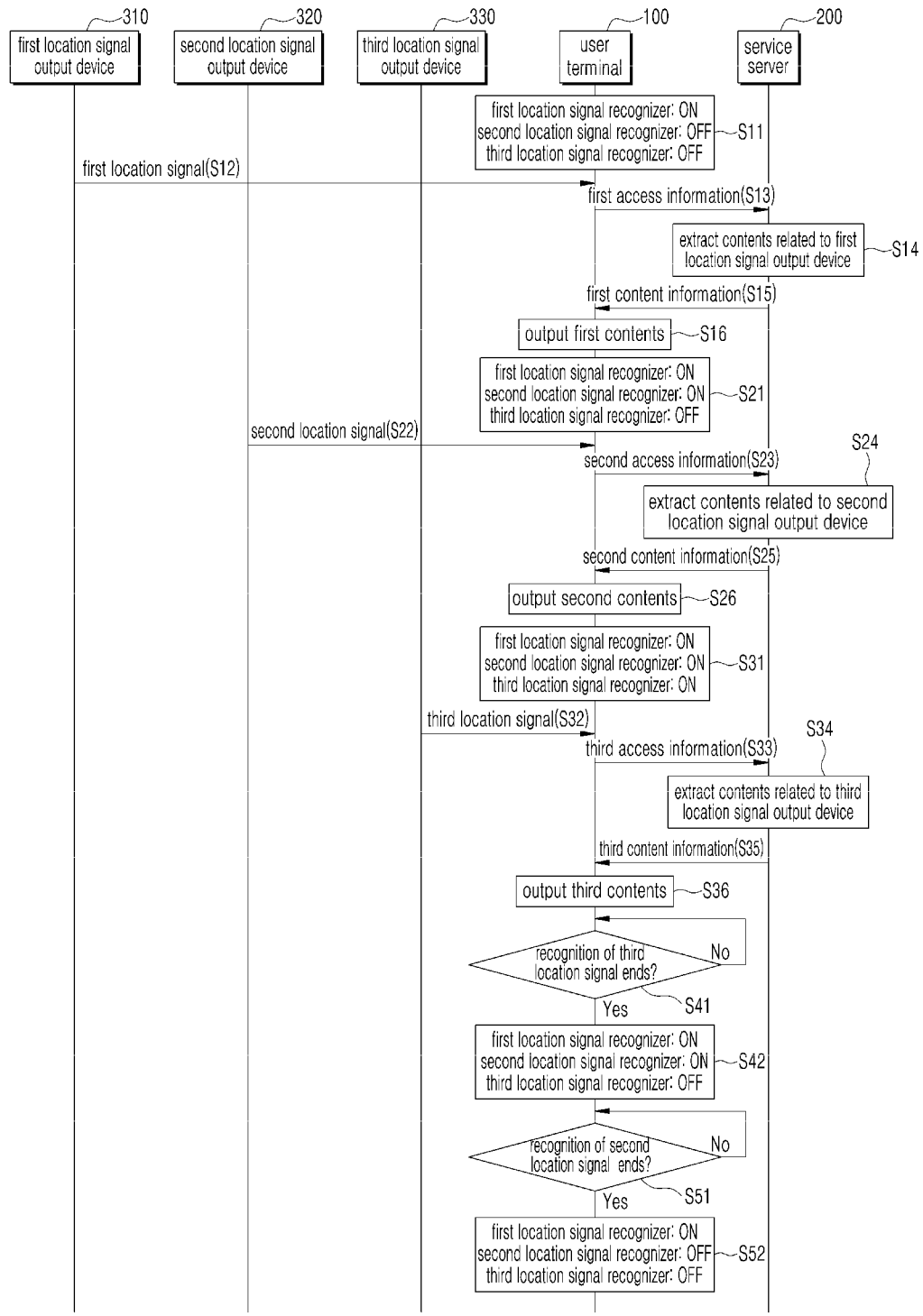

CONTENT PROVIDING SYSTEM BASED ON LOCATION INFORMATION RECOGNITION

CROSS-REFERENCE TO RELATED APPLICATIONS

This application is a divisional application of non-provisional U.S. patent application Ser. No. 14/521,214, filed on Oct. 22, 2014, which claims priority to and the benefit of Korean Patent Application No. 10-2014-0103601, filed on Aug. 11, 2014, the entirety of each of which are hereby incorporated by reference.

FIELD

The present disclosure generally relates to a content providing system based on location information recognition.

BACKGROUND

The statements in this section merely provide background information related to the present disclosure and may not constitute prior art.

According to the development of mobile communication technologies and user terminal hardware/software technologies, various pieces of information can be pushed to a user terminal belonging to a user. Further, according to the improvements in data processing rates of servers, a service which is capable of combining various pieces of user information and content information according to a big data analysis and providing suitable contents to a user can be provided.

It is preferable that such a content providing service provides contents which are suitable for the user, that is, in which the user is interested, or contents which the user desires to acquire at that time. Accordingly, various services which provide proper region information, store information, product information and the like in a corresponding location by using location information of a user terminal are provided.

As a method of identifying location information of the user terminal, various methods are already known and examples thereof may include the following methods. A geo-fence technology estimates location information of a user terminal by using Wi-Fi (wireless LAN), the Global Positioning System (GPS), and a base station signal together and has the advantage of covering a wide region. Further, there is a method of using a BLE beacon device in which a Bluetooth Low Energy (BLE) beacon device which outputs a BLE signal is installed in a predetermined location and a user terminal recognizes a beacon signal output from the BLE beacon device. In addition, there is a method in which a speaker which outputs sound waves is installed indoors and a user terminal recognizes the corresponding sound waves.

As described above, various location information identifying methods are already known, but they have advantages and disadvantages in coverage and accuracy. Further, when all of the three methods are used together, a user terminal should always enable a corresponding communication module, which leads to excessive battery consumption in the user terminal.

SUMMARY

The present disclosure provides a user terminal, a service server, a content information receiving method, and a content information providing method, and system for implementing a service which can identify more accurate location information while reducing batter power consumption of a user terminal and provide a user with more suitable contents in regards to the current location information of the user terminal by applying a hybrid method using various technologies for identifying location information.

In accordance with an aspect of the present disclosure, a user terminal for recognizing a location signal is provided. The user terminal includes: a first location signal recognizer configured to recognize a first location signal output from a first location signal output device; a second location signal recognizer configured to recognize a second location signal output from a second location signal output device; an access information transmitter configured to transmit access information of the first location signal output device or access information of the second location signal output device to an service server; and a controller configured to transmit the access information of the first location signal output device to the service server and enable the second location signal recognizer to monitor the second location signal when the first location signal is recognized.

In accordance with another aspect of the present disclosure, a service server for providing content information based on location information of a user terminal is provided. The service server includes: an access information receiver configured to receive access information of one of a first location signal output device, a second location signal output device, and a third location signal output device from the user terminal; a database unit configured to store a plurality of pieces of content information; a content extractor configured to, when the access information is received, extract at least one piece of content information to be transmitted to the user terminal among content information related to one location signal output device corresponding to the received access information; and a content provider configured to transmit the extracted content information to the user terminal through a network.

In accordance with another aspect of the present disclosure, a method of method for providing content information based on location information of a user terminal by a service server is provided. The method includes: receiving access information of one of a first location signal output device, a second location signal output device, and a third location signal output device from the user terminal; extracting, when the access information is received, at least one piece of content information to be transmitted to the user terminal among content information related to one location signal output device corresponding to the received access information; and transmitting the extracted content information to the user terminal through a network.

In accordance with another aspect of the present disclosure, a system is provided. The system includes: a plurality of location signal output devices having different coverages; a user terminal configured to, when a location signal output from one of the plurality of location signal output devices is recognized, transmit access information of the location signal output device to a service server and enable a location signal reception module for receiving a location signal output from a location signal output device having a smaller coverage; and the service server configured to, when the access information is received from the user terminal, extract at least one content information to be transmitted to the user terminal among content information related to one location signal output device corresponding to the received access information and provide the extracted content information to the user terminal.

According to the present disclosure, it is possible to provide a user terminal, a service server, a content information receiving method, and a method and a system for providing content information which implement a service capable of identifying more accurate location information while reducing battery power consumption of a user terminal and of providing a user with more suitable contents in regards to the current location information of the user terminal by applying a hybrid method using various technologies for identifying location information.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 schematically illustrates a content providing system according to an embodiment of the present disclosure;

FIG. 5 is a flowchart of a content service providing method according to an embodiment of the present disclosure.

Figure 1:
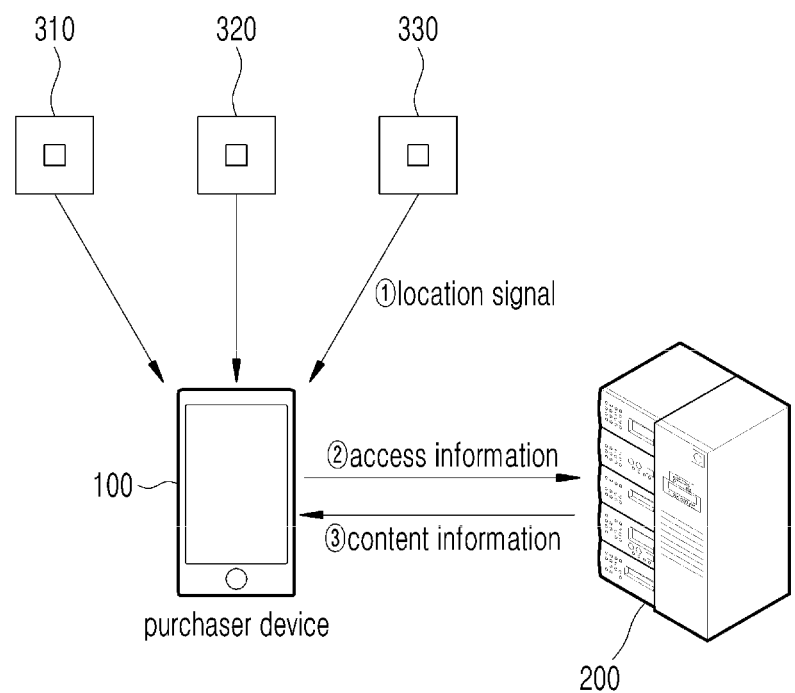

The drawings described herein are for illustration purposes only and are not intended to limit the scope of the present disclosure in any way.

DETAILED DESCRIPTION

It should be noted that the technical terms in the specification are merely used for describing a specific embodiment but do not limit the scope of the present invention. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

Hereinafter, exemplary embodiments of the present disclosure will be described in detail with reference to the accompanying drawings, equal or similar elements are assigned an equal reference numeral, and an overlapping description thereof will be omitted. Further, in the following description of the present invention, a detailed description of known technologies incorporated herein will be omitted when it may make the subject matter of the present disclosure rather unclear. Further, it should be noted that the accompanying drawings are intended only for the easy understanding of the technical idea of the present invention, and the spirit of the present invention should not be construed as being limited by the accompanying drawings. In addition to the accompanying drawings, the spirit of the present invention should be construed to cover all modifications, equivalents, and alternatives thereof.

FIG. 1 schematically illustrates a content providing system according to an embodiment of the present disclosure.

As illustrated in FIG. 1, the content providing system includes a user terminal 100, a service server 200, and a plurality of location signal output devices 310, 320, and 330. Here, the location signal output devices output location signals according to each device's different method. Although three location signal output devices 310, 320, and 330 are illustrated in FIG. 1, the idea of the present disclosure can be realized even if a location signal output device in a different communication type is added.

Hereinafter, unless otherwise stated, it is assumed that respective location signal output devices are first to third location signal output devices 310, 320, and 330, location signals output from the first to third location signal output devices 310, 320, and 330 are first to third location signals, access information transmitted to the service server 200 from the user terminal 100 after reception of the first to third location signals are first to third access information, and content information transmitted to the user terminal 100 from the service server 200 after reception of the first to third access information is first to third content information.

The first location signal output device 310 may be implemented as a device that outputs a radio signal based on geo-fence technology. The geo-fence technology estimates location information of the user terminal 100 by using Wi-Fi (wireless LAN), a Global Positioning System (GPS), and a base station signal together and may determine whether the user terminal 100 is located within a specific range (within a radius of several km). When location information of the user terminal 100 is measured using the first location signal, the widest coverage can be covered and the user terminal 100 consumes the smallest amount of power. However, when the location information is measured according to a radio signal based on the geo-fence technology, accuracy is not high and reception may not be possible indoors. Here, the coverage may be defined as an area in which each location signal can be recognized by the user terminal 100.

The second location signal output device 320 may be implemented as a Bluetooth Low Energy (BLE) beacon device that outputs a BLE beacon signal. The BLE beacon device may output a second location signal including its own identification information, for example, a Unique User IDentifier (UUID), the BLE beacon device being located in one space within a store. When the user terminal 100 is located near a store in which the BLE beacon device is installed, the user terminal 100 may recognize the second location signal. Then, the user terminal 100 transmits access information on the second location signal to the service server 200 through a mobile communication network, and thus the service server 200 may recognize the location information of the user terminal 100. Meanwhile, transmitting/receiving signals between the second location signal output devices 320 that output BLE beacon signals, performing bidirectional communication with the user terminal 100, and exchanging data with the service server 200 through a connection with a separate wired/wireless network are not required to realize the idea of the present disclosure.

When the second location signal is used, it is possible to acquire high accuracy since coverage of a BLE beacon signal is small from several m to a maximum of 70 m and to acquire low power consumption since the BLE technology is used. However, the second location signal has the following disadvantages: the second location signal can be used only when a Bluetooth reception function is turned on, the second location signal may penetrate a wall due to the characteristic of radio waves and thus may be recognized even when a user is located outside a corresponding store, and, in addition, as the coverage is small, a larger number of second location signal output devices 320 should be installed.

The third location signal output device 330 may be implemented as a device that outputs sound waves. When the third location signal output device 300 is installed inside a store, the sound wave cannot penetrate a wall and thus can be recognized only within the store. As a result, there is an advantage of acquiring high accuracy of location information. However, there are disadvantages in that the user terminal 100 should always turn on a corresponding reception module to receive the sound waves and the sound waves have a short travel distance corresponding to a maximum of 30 m.

Figure 2:
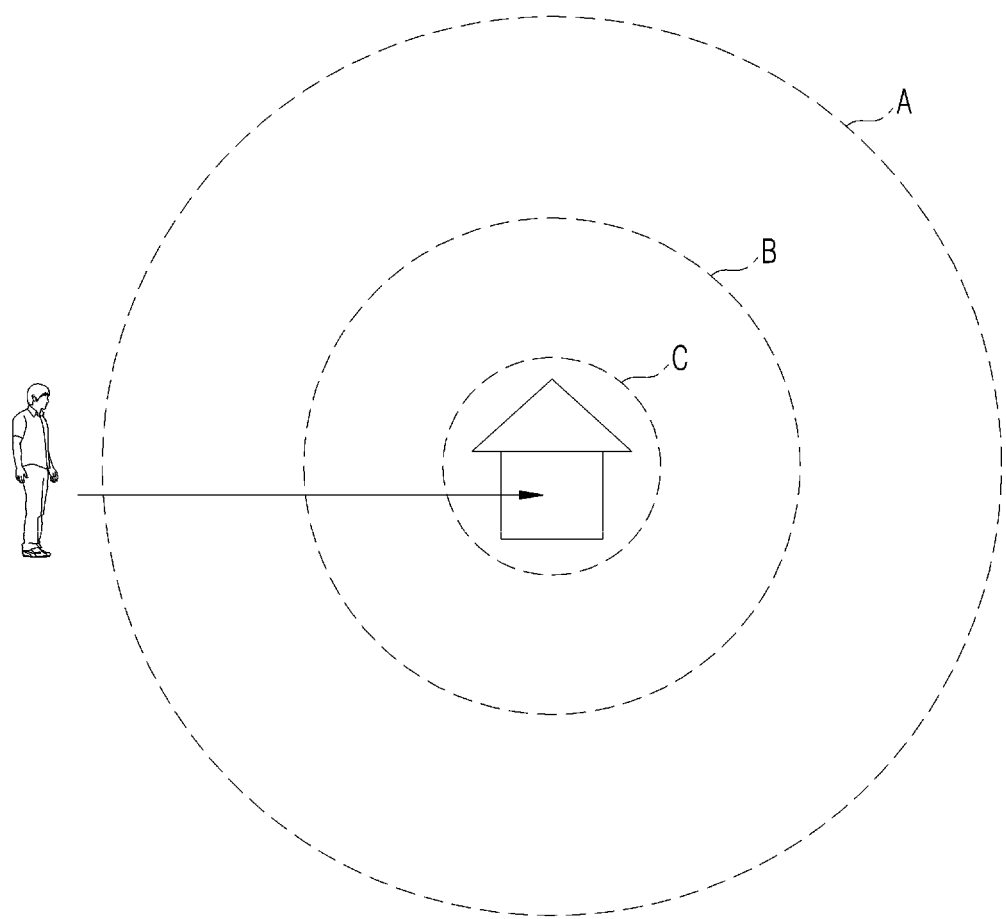
FIG. 2 illustrates a method of receiving first to third location signals when a user terminal moves according to an embodiment of the present disclosure.

As illustrated in FIG. 2, the first location signal output device 310 may cover a wide region A of a predetermined region unit, the second location signal output device 320 may be installed within a particular store and have a coverage B of a predetermined radius from the corresponding store, and the third location signal output device 300 may be installed within a particular store and have a coverage C corresponding to the inside of the corresponding store.

When the user terminal 100 receives location signals output from the first to third location signal output devices 310, 320, and 330, the user terminal 100 transmits, to the service server 200, access information informing that the user terminal 100 is located close to the corresponding location signal output devices. Here, the access information may include identification information of the location signal output device that outputs the recognized location signal, a reception time of the location signal, and identification information of the user terminal 100.

Meanwhile, the user terminal 100 may include communication modules for receiving the first to third location signals, for example, a first location signal receiver for receiving a first location signal such as Wi-Fi (Wireless LAN), a Global Positioning System (GPS) or the like, a second location signal receiver for receiving a second location signal such as a BLE signal, and a third location signal receiver for receiving a third location signal such as a sound wave.

As described above, the first to third location signal output devices 310, 320, and 330 have different coverages A, B, and C. The user terminal 100 enters a predetermined area within coverage A of the first location signal output device 310, approaches a particular store and is located near the store within coverage B of the second location signal output device 320, and then enters the corresponding store and may be located within coverage C of the third location signal output device 330. That is, in general, the user terminal 100 may recognize the second location signal by entering coverage B of the second location signal output device 320 included in coverage A of the first location signal output device 310 after recognizing the first location signal, and may recognize the third location signal by entering coverage C of the third location signal output device 330 included in coverage B of the second location signal output device 320 after recognizing the second location signal.

In this respect, in general, the user terminal 100 may turn on only the first location signal receiver, recognize the first location signal and turn on the second location signal receiver, and then recognize the second location signal and finally turn on the third location signal receiver in order to reduce power consumption.

A more detailed configuration of the user terminal 100 will be described below with reference to FIG. 3.

The service server 200 may communicate with several user terminals 100 through the network, receive access information from the user terminals 100, and provide many pieces of content information to the user terminals 100. Here, the content information may be, for example, advertisement contents, contents for an explanation of a store and a product, coupons or points which can be used in the store and the like.

When the service server 200 receives first access information of the first location signal output device 310 from the user terminal 100, the service server 200 may provide the user terminal 100 with region information related to an area of the first location signal output device 310 and information on a store located within the region. When the service server 200 receives second access information, the service server 200 may provide information related to a store in which the second location signal output device 320 is installed and benefit information such as coupons or points. When the service server 200 receives third access information, the service server 200 may provide product related information and discount information which can be used within the corresponding store.

A more detailed configuration of the service server 200 will be described below with reference to FIG. 4.

Figure 3:
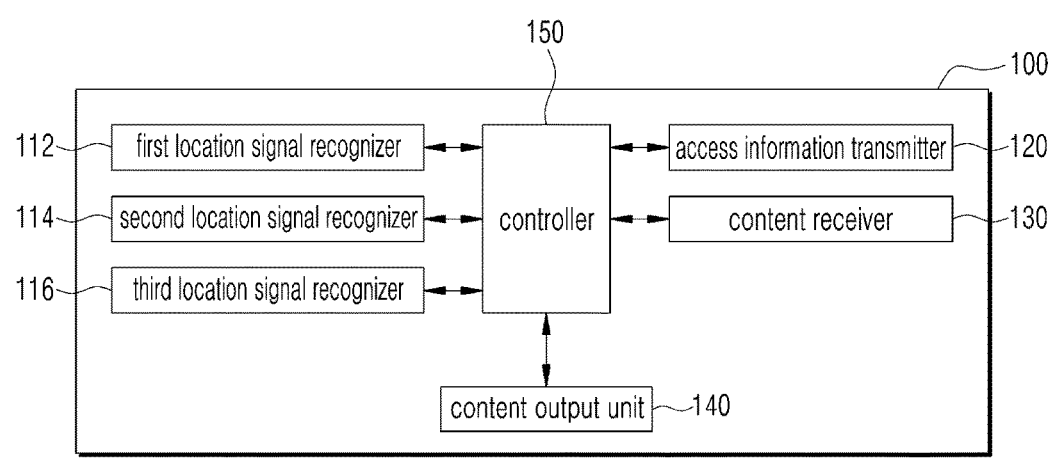
FIG. 3 is a block diagram of a user terminal according to an embodiment of the present disclosure.

FIG. 3 is a block diagram of the user terminal 100 according to an embodiment of the present disclosure.

As illustrated, the user terminal 100 includes a first location signal recognizer 112, a second location signal recognizer 114, a third location signal recognizer 116, an access information transmitter 120, a content receiver 130, a content output unit 140, and a controller 150, and the idea of the present disclosure can be realized even if some of the illustrated components are omitted or replaced.

The first location signal recognizer 112 is prepared to recognize a first location signal output from a first location signal output device. As described above, the first location signal output device 310 may be implemented as a Wi-Fi Access Point (AP) that outputs a radio signal based on the geo-fence technology and the first location signal recognizer 112 may be implemented as a hardware/software module for receiving Wi-Fi, a mobile communication base station signal, or a Global Positioning System (GPS) signal. The first location signal recognizer 112 maintains an enabled state unless there is a direct control by the user within the scope of the present disclosure.

The second location signal recognizer 114 is prepared to recognize a second location signal output from a second location signal output device. As described above, the second location signal output device 320 may be implemented as a Bluetooth Low Energy (BLE) beacon device installed within a store and the second location signal recognizer 114 may be implemented as a Bluetooth reception module which can receive a Bluetooth signal. The second location signal recognizer 114 may be enabled/disabled according to a control of the controller 150 described below without a separate control by the user.

The third location signal recognizer 116 is prepared to recognize a third location signal output from a third location signal output device. As described above, the third location signal output device 330 may be implemented as a sound wave output device installed within a store and the third location signal recognizer 116 may be implemented as a sound recorder which can receive a sound wave.

When the first to third location signal recognizers recognize one of the first to third location signals, the access information transmitter 120 transmits access information of the corresponding location signal output device to the external service server 200 through the network. Here, the access information may include identification information of the location signal output device that outputs the recognized location signal, a reception time of the location signal, and identification information of the user terminal 100. Meanwhile, in general, the user terminal 100 sequentially recognizes the signals according to an order of the first location signal, the second location signal, and the third location signal as described through FIG. 2, and the following description will be made based on the assumption.

The content receiver 130 receives content information from the service server 200. The content information may be, for example, advertisement contents, contents for an explanation of a store and a product, coupons or points which can be used in the store and the like. Meanwhile, the service server 200 may provide content information suitable for location information of the user terminal 100 according to the received access information and the content receiver 130 may receive the content information transmitted from the service server 200 through the network.

The content output unit 140 outputs the received content information. The content output unit 140 may include a display unit (not shown) that outputs a video signal contained in the content information and a speaker (not shown) that outputs an audio signal contained in the content information.

The controller 150 may be implemented as a processing unit such as a Central Processing Unit (CPU) performing a general control of the user terminal 100, an Application Processor (AP) or the like, and each control function performed by the controller 150 may be executed on a Software Development Kit (SDK). In connection with the idea of the present disclosure, the controller 150 transmits access information after the recognition of the location signal, controls the enabling/disabling of each location signal recognizer, and controls of an output of the received contents, and respective control operations will be sequentially described below.

When the first location signal is recognized, the controller 150 controls the access information transmitter 120 to transmit access information of the first location signal output device 310, that is, first access information to the service server 200, and controls the second location signal recognizer 114 to monitor the second location signal by enabling the second location signal recognizer 114. As described above, the second location signal recognizer 114 may be implemented as the Bluetooth reception module which can receive the BLE signal and unnecessary power may be consumed to monitor the Bluetooth signal in a state where the second location signal recognizer 114 is enabled. Accordingly, the controller 150 usually disables the second location signal recognizer 114, but enables the second location signal recognizer 114 after the first location signal is recognized.

Thereafter, when the second location signal is recognized, the controller 150 controls the access information transmitter 120 to transmit access information of the second location signal output device 320, that is, second access information to the service server 200 and controls the third location signal recognizer 116 to monitor the third location signal by enabling the third location signal recognizer 114.

When the third location signal is not recognized after the second location signal and the third location signal are sequentially recognized, it means that the user visits and then leaves the corresponding store. Accordingly, the controller 150 may disable the third location signal recognizer 116 in order to prevent unnecessary power consumption. Further, when the second location signal is not recognized after the first location signal and the second location signal are sequentially recognized, it means that the user is located near the corresponding store and then moves to another place. Accordingly, the controller 150 may disable the second location signal recognizer 114 in order to prevent unnecessary power consumption.

Based on the user terminal according to the present disclosure, there is an effect of providing accurate location information to the service server to allow the user to receive proper contents and reducing unnecessary power consumption which may be generated by the reception of each location signal.

Figure 4:
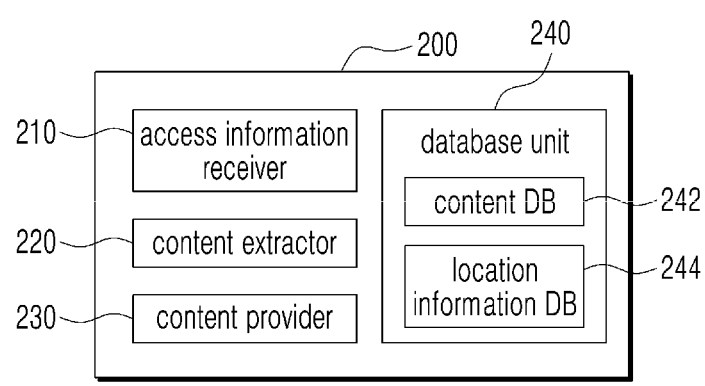
FIG. 4 is a block diagram of a service server according to an embodiment of the present disclosure.

FIG. 4 is a block diagram of the service server 200 according to an embodiment of the present disclosure.

As illustrated in FIG. 4, the service server 200 includes an access information receiver 210, a content extractor 220, a content provider 230, and a database unit 240, and the idea of the present disclosure can be realized even if some of the illustrated components are omitted or replaced.

The access information receiver 210 is connected to the network and receives access information of one of the first location signal output device 310, the second location signal output device 320, and the third location signal output device 330 from the user terminal 100. As described above, when the user terminal 100 enters the coverage of each of the location signal output devices 310, 320, and 330 and recognizes the location signal, the user terminal 100 may transmit access information related to the corresponding location signal output device 310, 320, or 330.

The database unit 240 may include a content DB 242 and a location information DB 244. The content DB 242 stores a plurality of pieces of content information. For example, the content information may include advertisement contents, contents for an explanation of a store and a product, and coupons or points which can be used in a store. The content DB 242 may map the content information with location information of each of region, store, and product and store the mapped information.

The location information DB 244 may store location information of each of the location signal output devices 310, 320, and 330. For example, the location information may include information on a store in which a Wi-Fi AP corresponding to one of the first location signal output devices 310 is located and information on a store in which a BLE beacon device corresponding to one of the second location signal output devices 320 is located.

The content extractor 220 identifies a plurality of contents related to location information of the location signal output device corresponding to the received access information among the content information stored in the content DB 242 of the database unit 240 and extracts at least one of the corresponding contents to be transmitted to the user terminal 100. For example, when second access information is transmitted from the user terminal 100, the content extractor 220 may extract identification information of the second location signal output device 320 included in second access information, identify a store in which the corresponding second location signal output device 320 is installed, identify content information mapped with the corresponding store and stored in the content DB 242, and then extract at least one piece of content information from the content information.

More specifically, when the content extractor 220 receives first access information from the user terminal 100, the content extractor 220 may extract at least one piece of first content information (for example, corresponding region information, information on a store located within the region) related to a region covered by the first location signal output device 310. When the content extractor 220 receives second access information from the user terminal 100, the content extractor 220 may extract at least one piece of second content information (for example, information on a corresponding store and benefit information such as coupons, points and the like) related to a store in which the second location signal output device 320 is located. When the content extractor 220 receives third access information from the user terminal 100, the content extractor 220 may extract at least one piece of third content information (for example, information on products and discount information) related to products sold in a store in which the third location signal output device 330 is located.

Here, a method of determining content information to be provided to the user terminal among a plurality of pieces of content information related to access information is based on personal information such as an age group or a preferred product of the user. Alternatively, there are already known various methods which assign priority according to a contract with each store and providing content information based on the priority and the method has no limitation.

The content provider 230 transmits the extracted content information to the user terminal 100 through the network.

Based on the service server 200 according to the present disclosure, by using a plurality of complex technologies for location-based offline business transactions, it is possible to identify a more accurate location of the user terminal 100 and thus provide optimized contents.

FIG. 5 is a flowchart illustrating a content service providing method according to an embodiment of the present disclosure.

Hereinafter, the same description of the technical features as that described with reference to FIGS. 1 to 4 will be omitted.

The user terminal 100 usually turns on the first location signal recognizer 112 and turns off the second and third location signal recognizers 114 and 116 in step S11.

When the user terminal 100 enters a coverage of the first location signal output device 310, that is, a particular region (having a radius of several km), the user terminal 110 recognizes a first location signal in step S12.

After recognizing the first location signal, the user terminal 100 transmits first access information of the first location signal output device 310 to the service server 200 in step S13. Here, the first access information may include identification information of the first location signal output device 310, a reception time of the first location signal, and identification information of the user terminal 100.

The service server 200 extracts content information related to the first location signal output device 310 from a plurality of pieces of content information stored in the database in step S14 and transmits the extracted first content information to the user terminal in step S15. Here, the service server 200 may extract at least one piece of first content information (for example, corresponding region information, information on a store located within the region and the like) related to a region covered by the first location signal output device 310 and transmit the extracted first content information to the user terminal 100.

After receiving the first content information through the network, the user terminal 100 outputs the first content information through a display or a speaker in step S16.

Further, after recognizing the first location signal, the user terminal 100 turns on the second location signal recognizer 114 in step S21. Accordingly, the first and second location signal recognizers 112 and 114 are in an on state and the third location signal recognizer 116 is in an off state.

When the user terminal 100 approaches a coverage of the second location signal output device 320, that is, near a particular store, the user terminal 100 recognizes a second location signal in step S22.

After recognizing the second location signal, the user terminal 100 transmits second access information of the second location signal output device 320 to the service server 200 in step S23.

The service server 200 extracts content information related to the second location signal output device 320 from a plurality of pieces of content information stored in the database in step S24 and transmits the extracted second content information to the user terminal in step S25. Here, the service server 200 may extract at least one piece of second content information (for example, information on a corresponding store, benefit information on coupons or points and the like) related to a region in which the second location signal output device 320 is located and transmit the extracted second content information to the user terminal 100.

The user terminal 100 receives the second content information and outputs the received second content information in step S26.

Further, after recognizing the second location signal, the user terminal 100 turns on the third location signal recognizer 116. Accordingly, the first to third location signal recognizers 112, 114, and 116 are all in an on state in step S31.

When the user terminal 100 enters a coverage of the third location signal output device 330, that is, a particular store, the user terminal 100 recognizes a third location signal in step S32.

After recognizing the third location signal, the user terminal 100 transmits third access information of the third location signal output device 330 to the service server 200 in step S33.

The service server 200 extracts content information related to the third location signal output device 330 from a plurality of pieces of content information stored in the database in step S34 and transmits the extracted third content information to the user terminal in step S35. Here, the service server 200 may extract at least one piece of third content information (for example, information on products, discount information and the like) related to products sold in a store in which the third location signal output device 330 is located and transmit the extracted third content information to the user terminal 100.

The user terminal 100 receives the third content information and outputs the received third content information in step S36.

Thereafter, when the already recognized third location signal is no longer recognized in step S41, it means that the user terminal 100 leaves the corresponding store and thus the user terminal 100 turns off the third location signal recognizer 116 to reduce power consumption in step S42.

Further, when the already recognized second location signal is no longer recognized in step S51, it means that the user terminal 100 leaves the vicinity of the store and thus the user terminal 100 turns off the second location signal recognizer 114 to in step S52.

Meanwhile, the content service providing method according to an embodiment of the present disclosure may be implemented through a computer program which can be executed by various operation processing units. The corresponding computer program may include a program command, a data file, and a data structure individually or a combination thereof. For example, the program command may include a high-level language code which can be executed by a computer through an interpreter as well as a machine language code which is made through a compiler. Further, the program command may be specially designed and configured for the present disclosure or may be used after being known to those skilled in software fields.

In addition, a computer program for detecting whether a beacon device has an error may be recorded in a computer-readable recording medium. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. The hardware devices may be configured to operate as one or more software modules to perform the operations of the present invention, and vice versa.

Although exemplary embodiments of the present invention have been described for illustrative purposes, those skilled in the art will appreciate that various modifications and changes may be made to the present invention by adding, changing, deleting, or supplementing constituent elements without departing from the scope and spirit of the present invention, and such modifications and changes may also fall within the present invention.

INDUSTRIAL APPLICABILITY

The present disclosure is highly applicable to the industries since the device to which the present disclosure is applied has a high probability of entering into the market and being sold, and thus the present disclosure can be obviously implemented in reality in that the present disclosure has an effect of implementing a service which can identify more accurate location information while reducing battery power consumption of a user terminal and providing a user with contents more suitable for current location information of the user terminal by applying a hybrid method using various technologies for identifying location information.

What is claimed is:

1. A user terminal for recognizing a location signal, the user terminal comprising:
    a first location signal recognizer configured to recognize a first location signal output from a first location signal output device;
    a second location signal recognizer configured to recognize a second location signal output from a second location signal output device;
    an access information transmitter configured to transmit access information of the first location signal output device or access information of the second location signal output device to an service server; and
    a controller configured to transmit the access information of the first location signal output device to the service server and enable the second location signal recognizer to monitor the second location signal when the first location signal is recognized.

2. The user terminal of claim 1, further comprising a third location signal recognizer configured to recognize a third location signal output from a third location signal output device,
    wherein the controller transmit the access information of the second location signal output device to the service server and enables the third location signal recognizer to monitor the third location signal when the second location signal is recognized.

3. The user terminal of claim 2, further comprising a content receiver configured to receive content information determined according to at least one of the access information of the first location signal output device, the access information of the second location signal output device and the access information of the third location signal output device.

4. The user terminal of claim 1, wherein the controller disables the second location signal recognizer when the second location signal is not recognized after the first location signal and the second location signal are recognized.

5. The user terminal of claim 2, wherein the controller disables the third location signal recognizer when the third location signal is not recognized after the second location signal and the third location signal are recognized.

6. The user terminal of claim 1, wherein a coverage of the second location signal output device is smaller than a coverage of the first location signal output device.

7. The user terminal of claim 2, wherein a coverage of the third location signal output device is smaller than a coverage of the first location signal output device and a coverage of the second location signal output device.

8. The user terminal of claim 2, wherein the first location signal is a geo-fence-based radio signal including at least one of Wi-Fi, GPS, and base station signals, the second location signal is a beacon signal output from a Bluetooth Low Energy (BLE) beacon signal, and the third location signal is a sound wave.

9. A service server for providing content information based on location information of a user terminal, the service server comprising:
    an access information receiver configured to receive access information of one of a first location signal output device, a second location signal output device, and a third location signal output device from the user terminal;
    a memory configured to store a plurality of pieces of content information;
    a content extractor configured to, when the access information is received, extract at least one piece of content information to be transmitted to the user terminal among content information related to one location signal output device corresponding to the received access information; and
    a content provider configured to transmit the extracted content information to the user terminal through a network.

10. The service server of claim 9, wherein the second location signal output device having a coverage smaller than that of the first location signal output device and the third location signal output device having a coverage smaller than those of the first location signal output device and the second location signal output device.

11. The service server of claim 9, wherein the first location signal output device is a device outputting a geo-fence-based radio signal including at least one of Wi-Fi, GPS, and base station signals, the second location signal output device is a beacon device outputting a Bluetooth Low Energy (BLE) beacon signal, and the third location signal output device is a device outputting a sound wave.

12. The service server of claim 9, wherein the content extractor extracts at least one piece of content information related to a region covered by the first location signal output device when access information of the first location signal output device is received, extracts at least one piece of content information related to a store in which the second location signal output device is located when access information of the second location signal output device is received, and extracts at least one piece of content information related to a product sold in a store in which the third location signal output device is located when access information of the third location signal output device is received.

13. A method for providing content information based on location information of a user terminal by a service server, the method comprising:
  receiving access information of one of a first location signal output device, a second location signal output device, and a third location signal output device from the user terminal;
  extracting, when the access information is received, at least one piece of content information to be transmitted to the user terminal among content information related to one location signal output device corresponding to the received access information; and
  transmitting the extracted content information to the user terminal through a network.

14. The service server of claim 13, wherein the second location signal output device having a coverage smaller than that of the first location signal output device and the third location signal output device having a coverage smaller than those of the first location signal output device and the second location signal output device.

15. The service server of claim 13, wherein the first location signal output device is a device outputting a geo-fence-based radio signal including at least one of Wi-Fi, GPS, and base station signals, the second location signal output device is a beacon device outputting a Bluetooth Low Energy (BLE) beacon signal, and the third location signal output device is a device outputting a sound wave.

16. The service server of claim 13, extracting further comprising at least one of:
  extracting at least one piece of content information related to a region covered by the first location signal output device when access information of the first location signal output device is received,
  extracting at least one piece of content information related to a store in which the second location signal output device is located when access information of the second location signal output device is received, and
  extracting at least one piece of content information related to a product sold in a store in which the third location signal output device is located when access information of the third location signal output device is received.

* * * * *